(12) United States Patent
Doyle

(10) Patent No.: US 9,223,783 B2
(45) Date of Patent: Dec. 29, 2015

(54) APPARATUS AND METHODS FOR MANAGING CONTENT

(75) Inventor: Thomas F. Doyle, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 533 days.

(21) Appl. No.: 12/852,517

(22) Filed: Aug. 8, 2010

(65) Prior Publication Data

US 2012/0036132 A1 Feb. 9, 2012

(51) Int. Cl.
*G06F 17/30* (2006.01)

(52) U.S. Cl.
CPC .... *G06F 17/30038* (2013.01); *G06F 17/30047* (2013.01); *G06F 17/3071* (2013.01); *G06F 17/30241* (2013.01)

(58) Field of Classification Search
CPC ............... G06F 17/30038; G06F 17/30241; G06F 17/30047; G06F 17/3071
See application file for complete search history.

(56) References Cited

U.S. PATENT DOCUMENTS

| | | | |
|---|---|---|---|
| 7,779,358 B1* | 8/2010 | Gupta et al. ................. | 715/730 |
| 7,991,283 B2* | 8/2011 | Chen et al. ................... | 396/310 |
| 8,010,548 B1* | 8/2011 | Beddow ........................ | 707/760 |
| 8,189,925 B2* | 5/2012 | Kroepfl et al. ............... | 382/216 |
| 2003/0179301 A1* | 9/2003 | Feldis et al. .............. | 348/231.3 |
| 2004/0088308 A1* | 5/2004 | Bailey et al. ............... | 707/100 |
| 2005/0041015 A1* | 2/2005 | Kohda et al. ................ | 345/156 |
| 2005/0110879 A1* | 5/2005 | Izume et al. .............. | 348/231.2 |
| 2006/0153460 A1* | 7/2006 | Kim et al. .................... | 382/225 |
| 2006/0197763 A1 | 9/2006 | Harrison et al. | |
| 2006/0241860 A1 | 10/2006 | Kimchi et al. | |
| 2007/0030360 A1* | 2/2007 | Udono ..................... | 348/231.99 |
| 2007/0081088 A1* | 4/2007 | Gotoh et al. ............. | 348/333.01 |
| 2007/0112777 A1* | 5/2007 | Field et al. ...................... | 707/10 |
| 2007/0115373 A1 | 5/2007 | Gallagher et al. | |
| 2007/0124325 A1* | 5/2007 | Moore et al. .................. | 707/102 |
| 2007/0150444 A1* | 6/2007 | Chesnais ................ | H04W 4/02 |
| 2007/0171046 A1* | 7/2007 | Diem ..................... | G06Q 10/00 340/539.13 |
| 2007/0209023 A1* | 9/2007 | Nakagawa et al. .......... | 715/838 |

(Continued)

FOREIGN PATENT DOCUMENTS

| CN | 101031914 A | 9/2007 |
| CN | 101427104 A | 5/2009 |

(Continued)

OTHER PUBLICATIONS

"Exchangeable Image File Format for Digital Still Cameras: Exif Version 2.2," by Standard of Japan Electronics and Information Technology Industries Association (2002). Available at: http://www.kodak.com/global/plugins/acrobat/en/service/digCam/exifStandard2.pdf.*

(Continued)

*Primary Examiner* — Daniel Kinsaul
(74) *Attorney, Agent, or Firm* — Scott A. Barker

(57) ABSTRACT

Apparatus and methods for managing content, such as content captured by a mobile device, are provided. The apparatus and method include receiving a plurality of content, which includes tag information, e.g., date and location information and an identifier for the mobile device. In addition, the apparatus and methods may include automatically grouping the content based on the tag information, and automatically labeling the content based on the tag information. For example, determined groupings of the content may be placed into folders and labeled based upon the tag information.

52 Claims, 11 Drawing Sheets

(56) References Cited

U.S. PATENT DOCUMENTS

| | | |
|---|---|---|
| 2007/0271297 A1 | 11/2007 | Jaffe et al. |
| 2008/0064438 A1* | 3/2008 | Calvet et al. ............... 455/556.1 |
| 2008/0082466 A1* | 4/2008 | Meijer et al. .................... 706/12 |
| 2008/0282177 A1* | 11/2008 | Brown et al. ................. 715/763 |
| 2009/0222482 A1* | 9/2009 | Klassen et al. ............. 707/104.1 |
| 2009/0280859 A1* | 11/2009 | Bergh ........................ 455/556.1 |
| 2009/0324022 A1* | 12/2009 | Sangberg et al. ............. 382/118 |
| 2010/0076976 A1* | 3/2010 | Sotirov et al. ................. 707/737 |
| 2010/0080420 A1* | 4/2010 | Abe ............................... 382/106 |
| 2010/0153386 A1* | 6/2010 | Tysowski ...................... 707/736 |
| 2010/0153465 A1* | 6/2010 | Dasgupta ...................... 707/802 |
| 2010/0156834 A1* | 6/2010 | Sangster ....................... 345/173 |
| 2010/0248744 A1* | 9/2010 | Bychkov et al. ........... 455/456.2 |
| 2010/0277611 A1* | 11/2010 | Holt et al. .................. 348/231.2 |
| 2011/0276924 A1* | 11/2011 | Voonna ........... H04M 1/274508 715/853 |

FOREIGN PATENT DOCUMENTS

| | | |
|---|---|---|
| CN | 101583942 A | 11/2009 |
| JP | 2006072522 A | 3/2006 |
| JP | 2009518704 A | 5/2009 |
| WO | WO-2007061728 A1 | 5/2007 |
| WO | WO-2010084585 A1 | 7/2010 |

OTHER PUBLICATIONS

"Better to Organize Personal Information by Folders or by Tags?: The Devil is in the Details," by Civan et al. IN: Proc. Amer. Cos. Information Science and Tech. (2009). Available at: ResearchGate.*

Christel M G et al.,: "Interactive Maps for a Digital Video Library", IEEE Multimedia, IEEE Service Center, New York, NY, US, vol. 7, No. 1, Jan. 1, 2000, pp. 60-67, XP000908490, ISSN: 1070-986X, DOI: 10.1109/93.839312.

International Search Report and Written Opinion—PCT/US2011/046806, ISA/EPO—Oct. 18, 2011.

Kentaro Toyama et al.,: "Geographical Location Tags on Digital Images", Proceedings of the 11th, ACM International Conference on Multimedia, MM 03, Berkeley, CA, Nov. 4-6, 2003; [ACM International Multimedia Conference], New York, NY : ACM, US, vol. CONF. 11, Nov. 2, 2003, pp. 1-12, XP002420408, ISBN: 978-1-58113-722-4.

Toni Navarette: "Semantic integration of thematic geographic information in a multimedia context", Thesis, Doctorate in Computer Science and Communication Department of Technology, Universitat P0mpeu Fabra, XX, XX, Jun. 1, 2006, pp. 1,XIII-XV,201, XP002563909.

* cited by examiner

APPARATUS AND METHODS FOR MANAGING CONTENT

BACKGROUND

The following relates generally to data management, and more specifically to methods and systems for automatically organizing content captured from media devices into sets and folders.

Media devices are widely deployed for capturing content, such as pictures and video. For example, a media device may include a mobile device such as a camera, a video recorder, a video camera, a personal digital assistant, a gaming device, etc. In a typical case, when a user takes a high volume of pictures or video clips, in order for the corresponding files to be organized in a sensible fashion, the user manually creates and names a folder, and moves the picture/video files into the folder. Further, a user often wants to provide additional information regarding a particular folder or picture/video file, and as such the user manually creates labels for the folders or files. As the number of content files increase, the amount of time and effort required for organizing the content files in a meaningful way also increases. Thus, a problem exists in the related arts for improving efficiency in organizing and managing content files and other generated media into meaningful groupings.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One aspect relates to a method for managing content. The method includes receiving one or more content. The method may also include creating tag information corresponding to each of the one or more content. In addition, the method may include determining one or more groupings of the one or more content based upon the tag information. Further, the method may include creating one or more groups for organizing each of the one or more groupings of the one or more content according to the tag information. Additionally, the method may include labeling one or more of the groups according to the tag information for the respective grouping.

Another aspect relates to at least one processor configured to manage content. The processor may include a first module for receiving one or more content. In addition, the processor may include a second module for creating tag information corresponding to each of the one or more content. The processor may also include a third module for determining one or more groupings of the one or more content based upon the tag information. Further, the processor may include a fourth module for creating one or more groups for organizing each of the one or more groupings of the one or more content according to the tag information. Additionally, the processor may include a fifth module for labeling one or more of the groups according to the tag information for the respective grouping.

Yet another aspect relates to a computer program product for managing content. The computer program product may include a computer-readable medium including at least one instruction for causing a computer to receive one or more content. The computer-readable medium may also include at least one instruction for causing a computer to create tag information corresponding to each of the one or more content. Additionally, the computer-readable medium may include at least one instruction for causing the computer to determine one or more groupings of the one or more content based upon the tag information. The computer-readable medium may also include at least one instruction for causing the computer to create one or more groups for organizing each of the one or more groupings of the one or more content according to the tag information. In addition, the computer-readable medium may include at least one instruction for causing the computer to label one or more of the groups according to the tag information for the respective grouping.

Another aspect relates to an apparatus for managing content. The apparatus may include means for receiving one or more content. Further, the apparatus may include means for creating tag information corresponding to each of the one or more content. The apparatus may also include means for determining one or more groupings of the one or more content based upon the tag information. Moreover, the apparatus may include means for creating one or more groups for organizing each of the one or more groupings of the one or more content according to the tag information. In addition, the apparatus may include means for labeling one or more of the groups according to the tag information for the respective grouping.

Still another aspect relates to an apparatus for managing content. The apparatus may include a communications component configured to receive one or more content captured by a content-capturing component. The apparatus may also include a tag generating component configured to create tag information corresponding to each of the one or more content. Furthermore, the apparatus may include a grouping component configured to determine one or more groupings of the one or more content based upon the tag information and create one or more groups for organizing each of the one or more groupings of the one or more content according to the tag information. The apparatus may also include a labeling component configured to label one or more of the groups according to the tag information for the respective grouping.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described aspects relate to methods and apparatus for managing content, such as content captured by a mobile device. The methods and apparatus may include receiving a plurality of content, which includes tag information, e.g., date and location information and an identifier for the mobile device. In addition, the methods and apparatus may include grouping the content based upon the tag information, and labeling the content based upon the tag information. For example, groupings of content may be placed into folders and labeled based upon the tag information.

In the subject disclosure, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Figure 1:
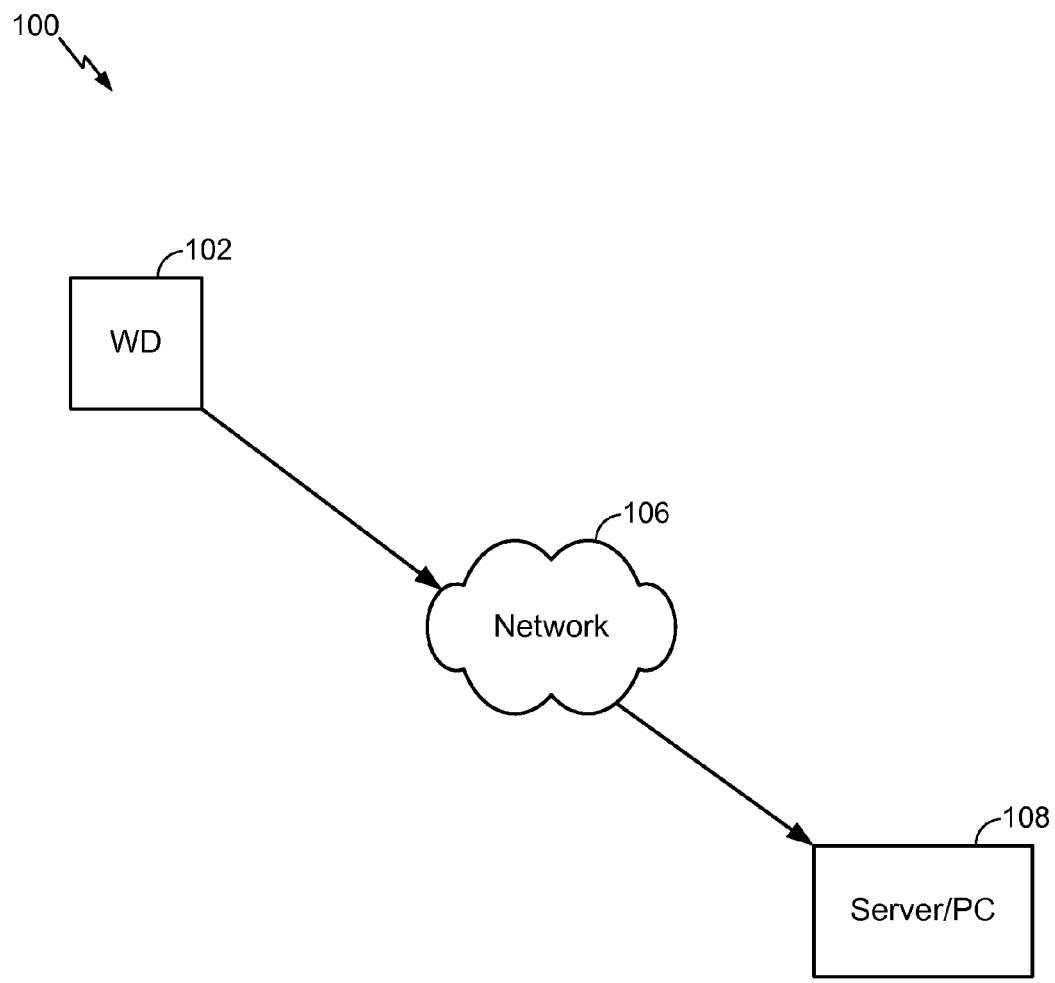
FIG. 1 is an illustration of a connectivity system in accordance with an aspect.

Referring now to FIG. 1, illustrated is an example connectivity system 100 that includes one or more wireless devices 102, one or more access networks 106 and one or more servers or computing devices 108. Wireless device 102 may include any mobile or portable computing or communications device, such as a cellular device, that may connect to an access network 106. Wireless device 102 may also include any device capable of capturing media content, e.g., pictures, video, and sound files, among other media content. Wireless device 102 may be, for example, a cellular telephone, a navigation system, a computing device, a camera, a PDA, a music device, or a handheld device having wireless connection capability, among other devices. Further, access network 106 may provide one or more types of communication connections to wireless device 102 and computing device 108. Server/computing device 108 may be a fixed device connected to a network. In an aspect, for example, wireless device 102 may capture and send various forms of media content via access network 106 to computing device 108, such as for long term storage and/or management of the content.

Figure 2:
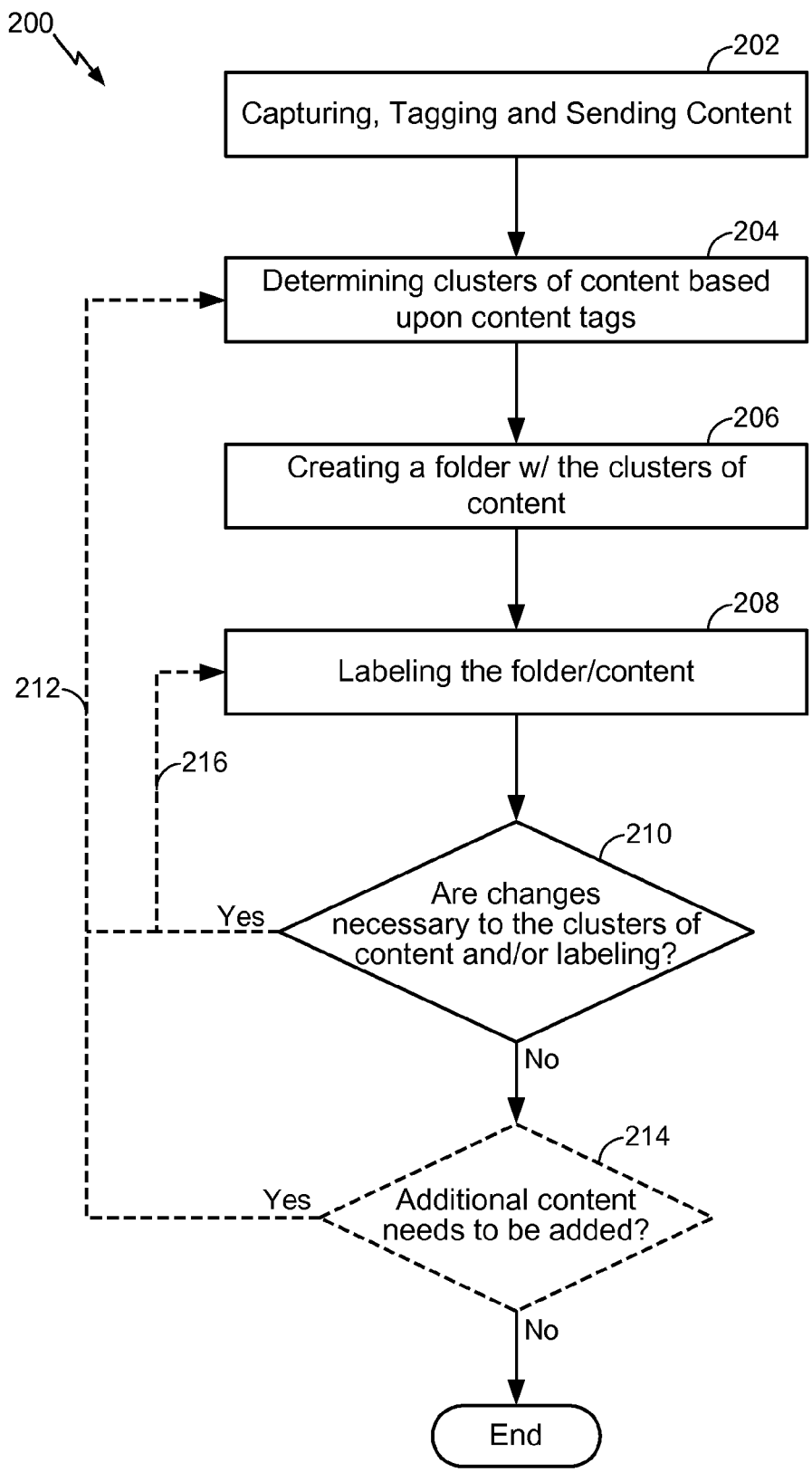
FIG. 2 is a flow chart illustrating an aspect of managing content in accordance with an aspect.

Referring now to the flow diagram 200 in FIG. 2, an aspect of a method of managing content includes, at 202, receiving a plurality of content and corresponding content tags. For example, wireless device 102 captures, tags and sends content, e.g., a picture file, an audio file or a video file, to a server or computing device 108. A content tag may include, but is not limited to, one or more of: a date/time stamp indicating the date and time the content was captured; a location stamp, e.g., latitude and longitude coordinates from a position/location component (e.g. a Global Positioning System (GPS) module) on the wireless device, indicating the coordinates where the content was captured, or a network identifier corresponding to a network component having a location that can be identified; a user identification (ID), e.g., user entered information for identifying the captured content, such as family vacation or birthday party; a pattern recognition stamp for identifying items in the captured content, e.g., people in pictures, using, for example, object recognition, audio recognition, and/or video recognition; a device identification for identifying the wireless device that captured the content, e.g., a source device tag for the camera, handset, or other device that originally created and/or captured the content; a content originator tag indicating the identity of the person who captured and/or created the content, e.g., associating a name of a person with the device that originated and/or captured the content; a content sender tag identifying information about the individual who forwarded the content captured, e.g., if the captured content is received by an individual, e.g., via e-mail, SMS (short message service), MMS (multimedia messaging service) or instant messaging. User information about the sender may be used for the sender tag, e.g., a telephone number or an e-mail address; and a set of shared content tags indicating individuals with whom the content was shared, e.g., the individual's name, phone number and/or e-mail address, among others. It should be appreciated that in one or more aspects, associating a name of a person with the device that originated and/or captured the content may include associating a phone number of the device that captured the content from a content list or address book stored on the device, for example. Moreover, if the content is received from a person, e.g., via e-mail, SMS (short message service), MMS (multimedia messaging service) or instant messaging, information about the sender may include, for example, a telephone number or an e-mail address for the sender which may also be associated with a person's identity, e.g., a name in a contact list and/or address book stored on the device, then the person's name may be used as the sender tag. Further, content tags can be obtained by integration to a calendar system that may be associated with a sender and/or receiver of the content. For example, a calendar may provide the name of an event that is associated with the time that the content was captured. A calendar may also provide the name of the location at which the content was captured. In addition, a calendar may further provide additional names of individuals that were in attendance at the calendar event where the content was captured. The content tags may also define additional metadata that is transferred along with the content to the server.

In a next step 204, the method includes determining one or more groups of the plurality of content based on the content tags. For example, computing device 108 creates groups of the received content by executing one or more grouping algorithms on the content tags. In other words, the initial plurality of content files may be separated into one or more groups of content files based on one or more attributes defined by the content tags, wherein each group comprises a subset of the initial plurality of content files. For example, the groups or logical clusters may be formed by using one or more algorithms for determining one or more of a spatial relationship, a temporal relationship, or both, between the different ones of the received content.

For example, in an aspect, a first portion of the plurality of content may be captured during a period of time but in varying locations. As such, the first portion of the plurality of content may have substantially similar temporal data, which may be used by a clustering algorithm to group the first portion of the plurality of content based upon a time when the content was captured instead of the location where the content was captured.

Alternatively, in an aspect, a second portion of the content may be captured in the same location, or area, over varying periods of time. As such, the second portion of the plurality of content may have substantially similar spatial data, e.g. position or location information, which may be used by a clustering algorithm to group the second portion of the plurality of content based upon the location and/or area where the content was captured instead of a time when the content was captured.

In another alternative, in an aspect, a third portion of the content may be captured in the same location or area during the same time period. As such, the third portion of the plurality of content may have substantially similar temporal data and substantially similar spatial or location data. In this case, a clustering algorithm may group the third portion of the plurality of content based upon when the content was captured, as well as based upon the location and/or area where the content was captured.

Thus, the one or more algorithms for creating groups of the plurality of content may group the content based upon time data, location data, or based on both the time and location data associated with the content.

It should be appreciated that various algorithms may be used for determining the groups of content by using different combinations of looking at the spatial and temporal data. In addition, the algorithms may be tuned to determine smaller or larger groupings of content, e.g. corresponding to smaller or larger ranges of temporal data, or corresponding to smaller or larger ranges of location data. Examples of algorithms for grouping the data are discussed in more detail below in regards to FIGS. 3 and 4.

Next, at 206, the method includes creating one or more folders for storing the one or more groups of content. The creation of each folder is based on the existence of a group of content. In other words, once a logical grouping of content is identified, the logical grouping is stored in a folder specific to that logical grouping. It should be appreciated that the folders may include a single group of content or multiple sub-groups of content depending on the user's preferences and/or the type of algorithm used above in step 204.

At 208, the method may include creating a label for the folder, creating a label for the content, or both. In one aspect, for example, the user may review the content in the folders and create folder names/labels describing the content grouped within the folder, as well as creating labels or descriptors of the individual files defining the content. In another aspect, for example, creating labels for the folders and/or the content occurs automatically using at least one labeling algorithm. For example, a labeling algorithm may include using forward or reverse geo-coding to determine labeling information to associate with the content based on a corresponding content tag. Forward geo-coding includes providing an address to a geo-coding component or engine and receiving corresponding latitude and longitude coordinates for the address. Reverse geo-coding includes entering latitude and longitude coordinates into the geo-coding component or engine and receiving corresponding address information, such as one or more of a street address, a city name, a state name or abbreviation, or a zip code. In addition, in an aspect, a labeling algorithm may access a user contact list and/or calendar, both also referred to as a personal information manager, stored on wireless device 102 or stored on computing device 108 for determining labeling information to associate with the content. For example, the contact list or calendar may have information that can be correlated to a location or time of the content, and thus the information may be used to supplement the folder or content file label. Examples of labeling algorithms are discussed below in regards to FIGS. 5-7.

In an optional aspect, at 210, the method may include receiving an indication of whether or not the grouping of the content, or the labeling of the content, or both, are satisfactory. For example, the device may receive an indication from a user based on a user-determination as to whether the groups of content and/or the labeling of the folders are acceptable to the user. If the indication is that changes need to be made to the groups of content, then the process follows 212 back to 204, where the process may repeat the grouping using the same or different grouping algorithms, or different user-determined or algorithm-determined parameters for such algorithms, until the grouping of the content is satisfactory to the user. Alternatively, the device may receive manual instructions from the user to move the content around into different folders and/or create new folders for the content. If the indication is that changes need to be made to the labeling of the folders, then the process follows 216 back to 208, where the process may repeat the labeling using the same or different labeling algorithms until the labeling of the folders is satisfactory to the user. Alternatively, the device may receive manual instructions from the user indicating a specific change to the labels of the folders or adding additional labels to the folders.

Optionally, at 214, the method may include determining whether additional content should be added to the folders. For example, the user may have uploaded additional pictures from wireless device 102, taken additional pictures, or added additional pictures from a different wireless device. In one aspect, if the method determines that additional content should be added to the folders then, at 212, the process may return to 204 and repeat the same with the additional content, or with a combination of the additional content and the previously-received plurality of content. For example, the user may determine that the additional content should be added to the created folders, thus, the algorithms for grouping the content together may include the additional content with the already received content during the grouping process. A set of metadata may be stored along with the folders defining how the content is grouped together. In an aspect, the metadata may be used for determining whether to add the additional content into the groups, thus, providing consistency to the group definition. In addition, or alternatively, the user may determine that the additional content should be grouped without the previously received content. As such, the algorithms for grouping may use the additional information alone during the grouping process and maintain the folders with the previously grouped content, or combine all of the content, or both. In an aspect, if the user determines that additional content should be added to the created folders and/or new folders, then the user may manually add the content to the respective folders.

Figure 3A:
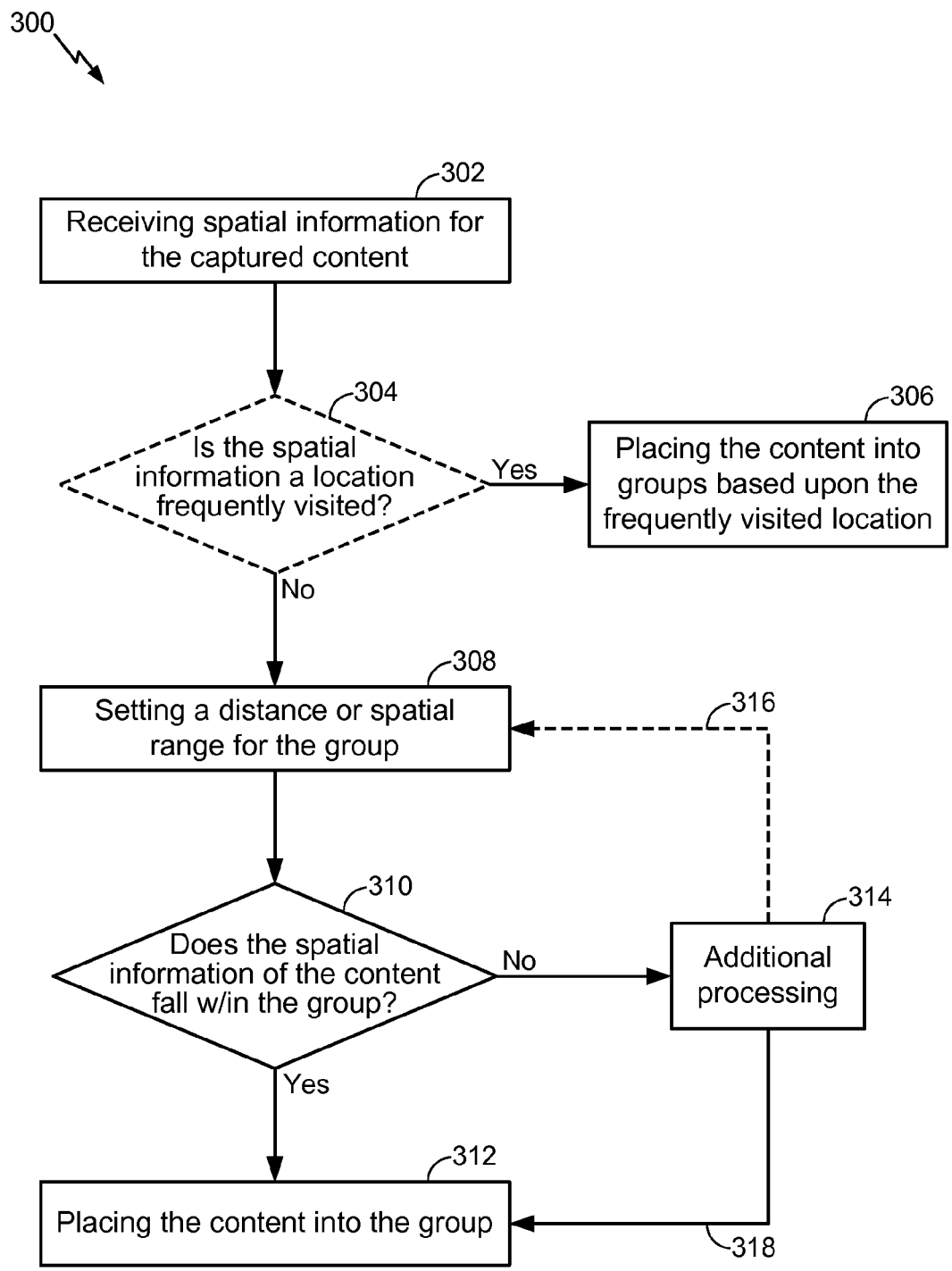
FIG. 3a is a flow chart illustrating a spatial algorithm in accordance with an aspect.

Turning now to the flow diagram 300 in FIG. 3a, a method of executing a spatial algorithm in accordance with one aspect is disclosed. At 302, the method includes receiving location information for the captured content. For example, computing device 108 may receive location information, e.g., latitude and longitude coordinates, for the captured content from wireless device 102 (FIG. 1). In an optional aspect, at 304, the method may include determining whether the location information for the captured content is a location frequently visited. For example, computing device 108 may determine if the location information for the captured content is a location where wireless device 102 visits frequently, e.g., locations where the wireless device visits repeatedly or locations where a number of pictures and/or videos are captured by the wireless device irrespective of the time when the content is captured. In an aspect, computing device 108 may review a data repository containing the location history of wireless device 102, e.g., a set of locations wireless device 102 visits frequently, in determining whether the location where the content was captured is a location where the wireless device 102 visits frequently. It should be appreciated that the data repository containing the location history may also include the names of the locations where wireless device 102 visits frequently. At 306, if the location of the captured content is a frequently visited location, the method may include placing the content into groups based upon the frequently visited location. For example, computing device 108 may place the captured content into a group based upon the location history of wireless device 102 if the captured content matches with a location stored in the location history data repository.

In another aspect, at 308, the method may include setting a distance or spatial range for the grouping with respect to one or more locations or points of interest. Each location, for example, may be a known location corresponding to at least a portion of the grouping, such as a first portion of a grouping of photo content having a centroid near a zoo, and a second portion of the grouping of photo content having a centroid near a park. In some aspects, computing device 108 may set a distance or spatial range from the location, e.g., 50 yards, 10 miles, a distance range or spatial area corresponding to a city, or a distance range or spatial area corresponding to a country, among other distances or ranges, for the grouping. At 310, the method includes determining whether the location of the captured content is within the distance range for the grouping. For example, computing device 108 determines whether the coordinates for the location of the captured content is within the distance range, e.g., 50 yards, 10 miles, a city, or a country, among other distances, for the group. Next, at 312, the method includes placing the content into a group, if the location of the captured content is within the distance range for the group. For example, if computing device 108 determines that the location information of the captured content is within the distance range for the group, then the captured content is placed into the group. It should be appreciated that the content may be associated with one or more groups. In an aspect, a group identifier may be associated with the content for identifying the groups to which the content may belong. Thus, instead of placing multiple copies of the same content into various groups, the group identifier may be used for identifying the groups to which the content belongs.

However, if the method determines that the location information of the captured content is not within the distance range for the group, then, at 314, the method may include performing additional processing on the location information for placing the captured content in another group. The additional processing may include one or more of associating the ungrouped content into a closest group, or placing the captured content on a map and receiving manual instructions from a user to use in placing the content into a group, or receiving manual instructions from a user to move the content around to different folders and/or create new folders for the content. In other aspects, the additional processing may also include determining whether the algorithm includes a degree of ambiguity or uncertainty and whether the ungrouped content is within the expected degree of ambiguity or uncertainty to be placed in a group, among other additional processing that may be used to place the content into groups. The uncertainty determinations can also include evaluation of the accuracy of the location data. For example, location data that is less accurate may indicate a lower probability of falling into the spatial range being analyzed.

In an optional aspect, the method may include following 316 back to 308, where the process may repeat the determining a distance or spatial range for the grouping with a different range for the grouping. The method may follow 318 to 312, where the process may place the content into the group that is determined for the captured content.

Figure 3B:
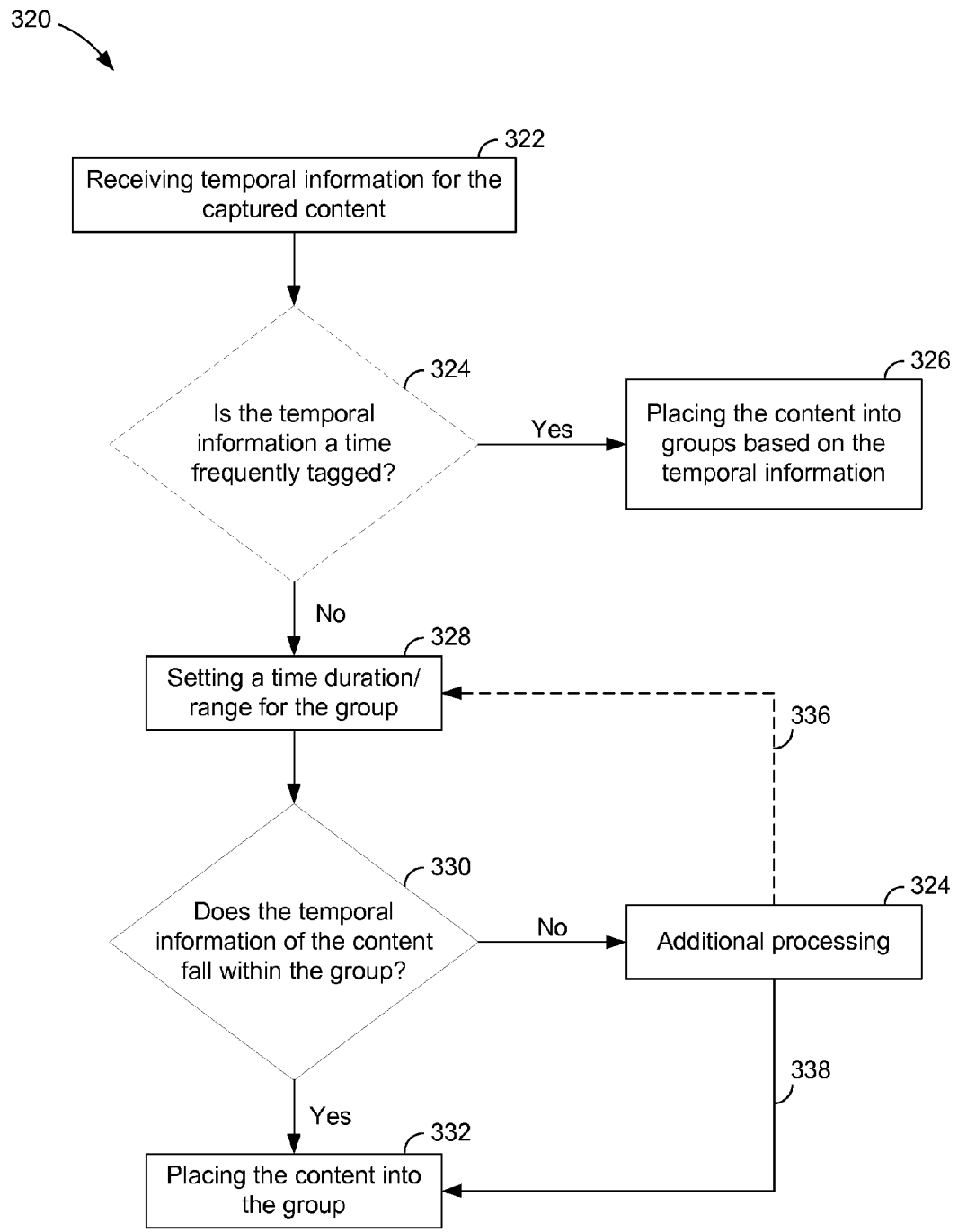
FIG. 3b is a flow chart illustrating a temporal algorithm in accordance with an aspect.

Turning now to the flow diagram 320 in FIG. 3b, a method of executing a temporal algorithm in accordance with one aspect is disclosed. At 322, the method includes receiving temporal information for the captured content. For example, computing device 108 may receive temporal information, e.g., time and date information, for the captured content from wireless device 102 (FIG. 1). In an optional aspect, at 324, the method may include determining whether the temporal information for the captured content is a time when content is frequently captured. For example, computing device 108 may determine if the temporal information for the captured content is a time or date when wireless device 102 frequently captures content, e.g., the same day each year or during the same week or month. In an aspect, computing device 108 may review a data repository containing the temporal history of wireless device 102, e.g., a set of times and dates that wireless device 102 captures content, in determining whether the time when the content was captured is during a time that wireless device 102 frequently captures content. It should be appreciated that the data repository containing the temporal history may also include the names of the locations of the places where wireless device 102 captures content frequently. At step 326, if the temporal information of the captured content is during a time when content is frequently captured, the method may include placing the content into groups based upon the time and/or date the content was tagged. For example, computing device 108 may place the captured content into a group based upon the temporal history of wireless device 102, e.g., if the time and/or date of the captured content matches with a time and/or date stored in the temporal history data repository.

In another aspect, at 328, the method may include setting a time or temporal range for the grouping with respect to one or more time periods and/or dates. For example, computing device 108 may set a time and/or date range, e.g., a week, a month, a range of years, or time periods during the day, among other time and/or date ranges, for the grouping. At 330, the method includes determining whether the temporal information of the captured content is within the time and/or date range for the grouping. For example, computing device 108 determines whether the time and/or date of the captured content is within the time and/or date range, e.g., a week, a month, or time period during the day, among other time and/or date ranges, for the group. At 332, the method includes placing the content into a group, if the temporal information of the captured content is within the time and/or date range for the group. For example, if computing device 108 determines that the temporal information of the captured content is within the time and/or date range for the group, then the captured content is placed into the group.

However, if the method determines that the temporal information of the capture content is not within the time and/or date range for the group, then, at 334, the method may include performing additional processing on the temporal information for placing the captured content in another group. The additional processing may include one or more of associating the ungrouped content into a closest group, or receiving manual instructions from a user to use in placing the content into a group, or receiving manual instructions from a user to move the content around to different folders and/or create new folders for the content. In one or more other aspects, the additional processing may also include determining whether the algorithm includes a degree of ambiguity or uncertainty and whether the ungrouped content is within the expected degree of ambiguity or uncertainty to be placed in a group, among other additional processing that may be used place the content into groups.

In an optional aspect, the method may include following 336 back to 338, where the process may repeat the determining a time and/or date range for the grouping with a different range for the grouping. The method may follow 338 to 332, where the process may place the content into the group that is determined for the captured content.

Figure 4:
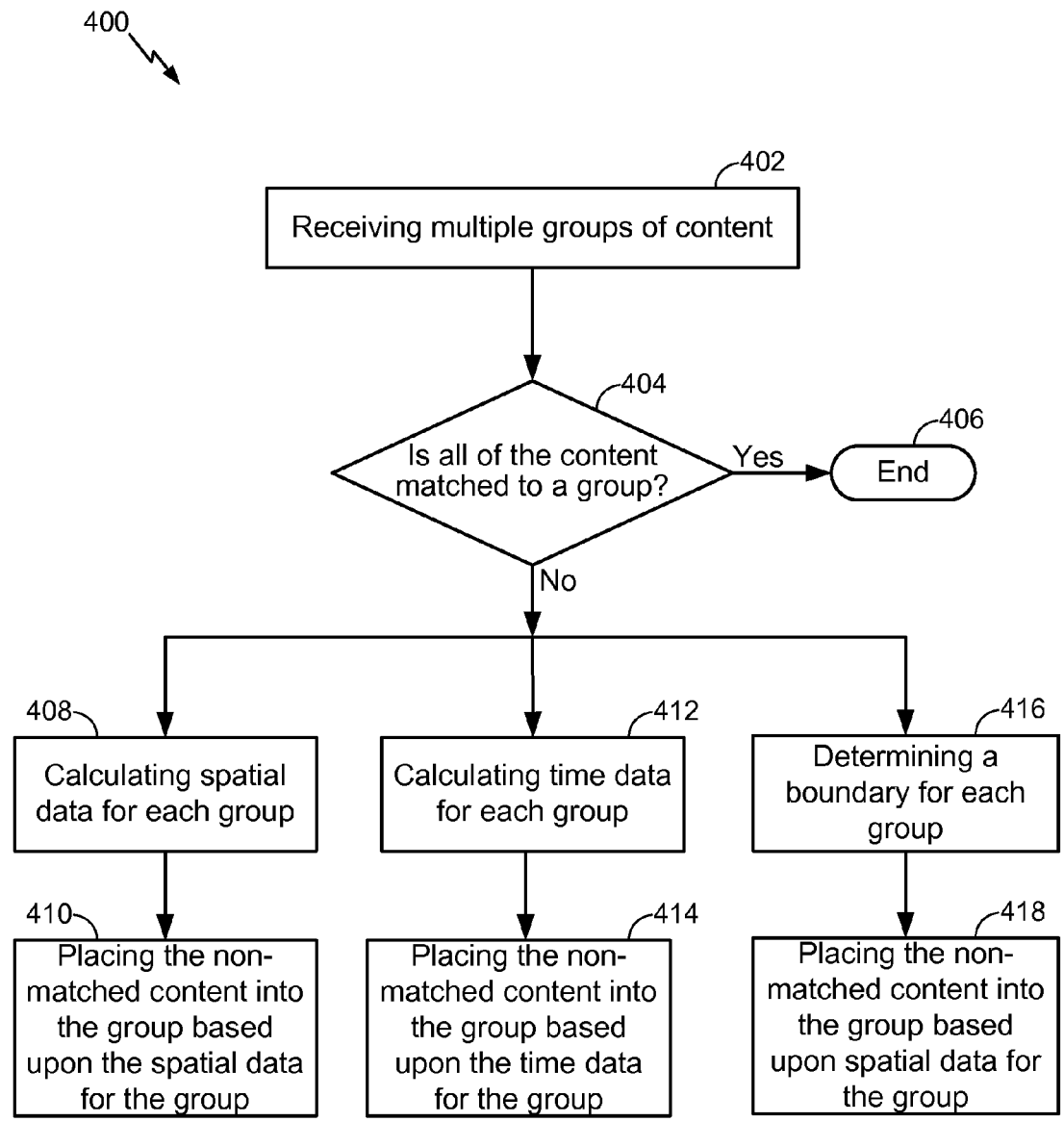
FIG. 4 is a flow chart illustrating a spatial algorithm in accordance with an aspect.

Referring now to the flow diagram 400 in FIG. 4, an aspect of a method of executing a spatial algorithm after the content has been initially grouped into groups is disclosed. The method 400 may be used, for example, in one aspect of the additional processing at 314 of FIG. 3, as described above. At 402, the method includes receiving multiple groupings of content. For example, computing device 108 receives multiple groups of content, e.g., at least two groups of content. At 404, the method includes determining whether any of the plurality of originally-received content is not matched to any of the groupings. At 406, if the method determines that all of the content is matched between the groups, the method ends with the content grouped into the various groups.

However, at 408, in one aspect, if the method determines that some of the content is outlying from the existing groups, then the method may calculate spatial data for each group. For example, the spatial data may include calculating a spatial centroid, e.g., a geographic center or median point, for each group of content, among other spatial data for the group. For example, computing device 108 may calculate a spatial centroid for each of the groups, e.g., if there are two groups, then computing device 108 calculates a separate spatial centroid for each group. Next, at 410, the method includes placing the outlying content into the existing groups based upon the spatial data for the group and the spatial data of the outlying content. For example, computing device 108 may determine a geographic distance from each outlying content item to the calculated centroid for each group, and place the content into the group closest to the outlying content based on the geographic distance.

In another aspect, at 412, in one aspect, if the method after 406 determines that some of the content is outlying from the existing groups, then the method may calculate time data for each group. For example, the time data may include calculating a time centroid, e.g., an average or median time, for each group of content. For example, computing device 108 may calculate a time centroid for each of the groups, e.g., if there are two groups, then computing device 108 calculates a separate time centroid for each group. Next, at 414, the method includes placing the outlying content into the existing groups based upon the time data for the group. For example, computing device 108 may determine a time difference from each outlying content item to the calculated time centroid for each group, and place the content into the group having the closest time centroid based on the time difference.

In another aspect, at 416, if the method after 406 determines that some of the content is outlying from the existing groups, then the method may determine a boundary for each group. The boundary for each group may be determined by creating an encompassing structure, such as a best-fit polygon, around the content of each group. Next, at 418, the method includes placing the outlying content into the existing groups based upon the boundary for each group and the spatial data for the outlying content. For example, computing device 108 may determine a geographic distance from each outlying content item to the boundary of each group, and place the content into the group closest to the outlying content based on the geographic distance.

It should be noted that the method 400 may perform the grouping of outlying content based in spatial data, time data, or some combination of both.

Figure 5:
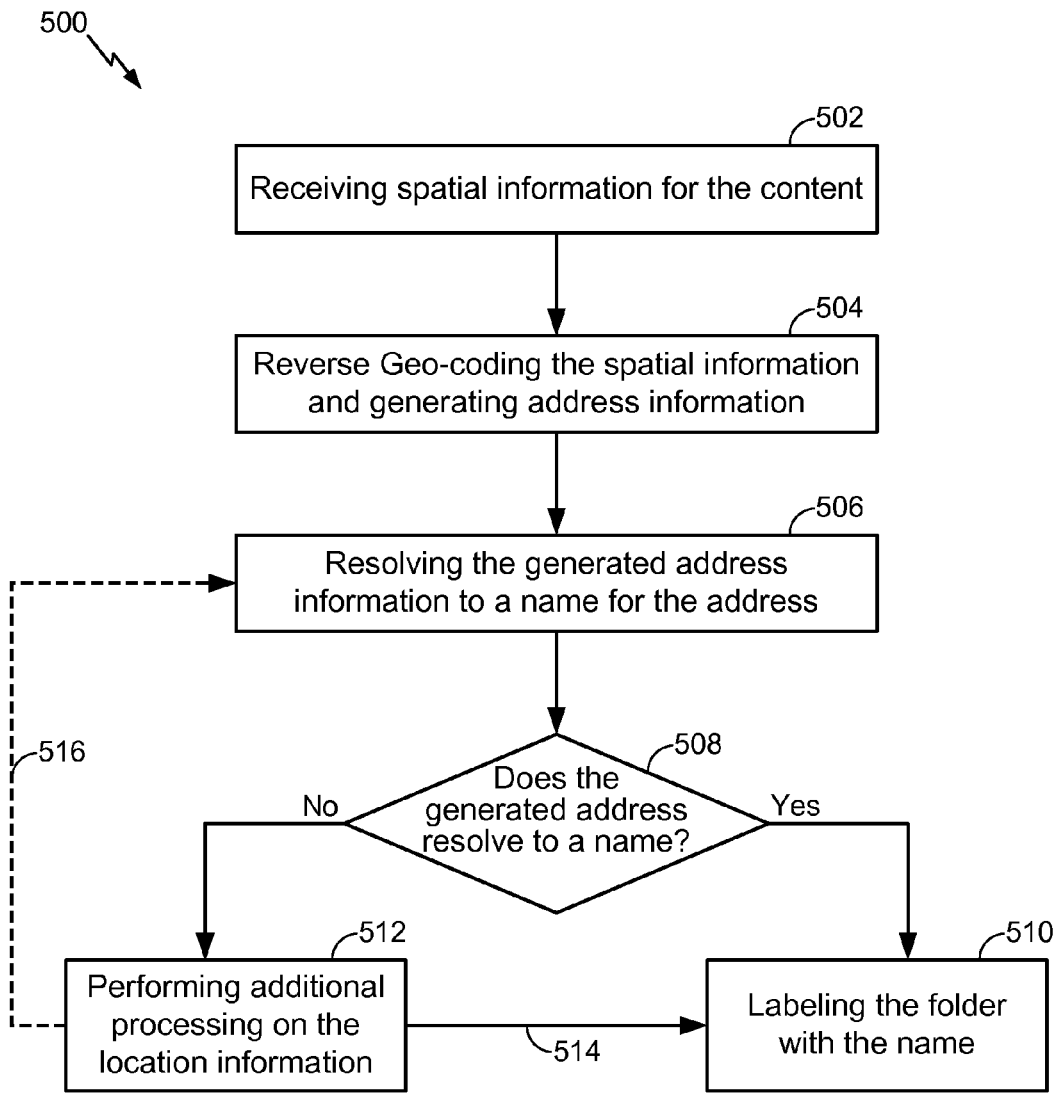
FIG. 5 is a flow chart illustrating an auto-labeling reverse geo-coding operation in accordance with an aspect.

Turning now to the flow diagram 500 in FIG. 5, an aspect of a method of labeling folders of content using reverse geo-coding is disclosed. At 502, the method includes receiving location information for the captured content. For example, computing device 108 receives location information for the content, e.g., latitude and longitude coordinates from a position/location component (e.g., a Global Positioning System (GPS) module) on wireless device 102 indicating the location where the content was captured. At 504, the method includes providing the location information to the geo-coding engine and receiving corresponding address information, such as one or more of a street address, a city name, a state name or abbreviation, or zip code. For example, computing device 108 may reverse geo-code the location information by entering the latitude and longitude coordinates of the captured content into the geo-coding component or engine and receiving corresponding address information for the provided coordinates. It should be appreciated that any method for using location information for generating an address may be used during the reverse geo-coding process.

Next, at 506, the method includes resolving a name to the generated address. In one aspect, computing device 108 may access an internet connection for associating the address with a name of a business or place, e.g., a hospital, a park, a hotel, or airport, among other places. For example, the user may search the internet with the address to resolve the address to a name of a business or a place. In another aspect, computing device 108 may use a POI (Point of Interest) database to resolve the address to a name. The POI database may include, for example, known points of interest associated with an address, the latitude/longitude of the location, or a geospatial centroid of the location. Known point of interests may include businesses, airports, hotels, restaurants, and hospitals, among other known points of interest. Thus, computing device 108 may enter an address into the POI database and resolve the address to the name of a location based upon the address listings in the POI. Alternatively, computing device 108 may enter an address into the POI and receive a list including the name of the nearest points of interests to the address. It should be appreciated that computing device 108 may enter additional location information into the POI database for resolving the location of the captured content to the name of the location. For example, computing device 108 may enter latitude and longitude coordinates for the content into the POI database or other location tags, such as zip codes, among other location information. Computing device 108 may determine that the most frequently occurring point of interest in the group is the best match for the name of the group. In addition, computing device 108 may also determine the geographic centroid of the group. The geographic centroid may be used for determining the point of interest for the group and for generating the name of the group, e.g. the point of interest closest to the geographic centroid may be associated with the group. In another aspect, computing device 108 may use public directories and search the public directories with the address information for the name of the location. In one or more further aspects, computing device 108 may access a contact list associated with the device or owner of the content in order to correlate the spatial information of the content to corresponding information in the contact list, as is discussed in more detail below with respect to FIG. 6. It should be appreciated that any number of methods may be used for resolving the address to a name for the purpose of labeling the address.

Next, at 508, the method includes determining whether the address resolves to a name. If so, at 510, the method may include creating a label for the folder with the name to which the address resolves. For example, computing device 108 may label the folder and/or the content with the name of the address generated at 506. In an aspect, if multiple names match the address entered, then computing device 108 may prompt the user to select a name from the list of available names for labeling the folder and/or content.

If the address does not resolve, then at 512 the method may include performing additional processing on the location information. For example, computing device 108 may perform additional processing on the location information attempting to associate a name with the location information, such as reviewing a calendar during the period of time the content was captured for determining whether the name of the location is entered in the calendar during the time period the content was captured. For example, computing device 108 may review a calendar associated with wireless device 102. Further, the additional processing may include one or more of prompting the user to manually enter a label for the folder, determining that the most frequently occurring location for the group is the best match for the name of the group, or re-grouping the content into different groups (FIG. 2), among other additional processing. At 514, the method includes labeling the folder and/or the content within the folder with the name associated with the location information. In an aspect, the method may follow 516 back to 506 and repeat same with smaller or larger groupings of content, e.g., corresponding to smaller or larger ranges of temporal data, or corresponding to smaller or larger ranges of location data.

Figure 6:
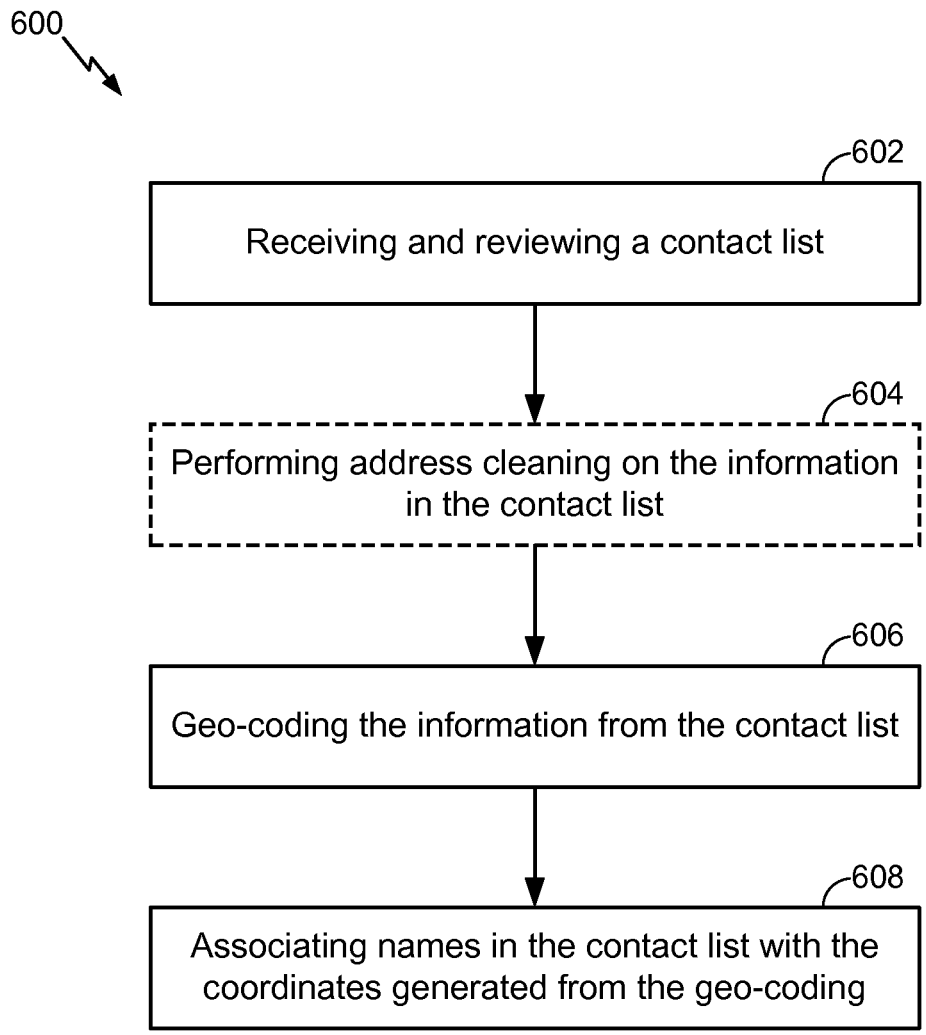
FIG. 6 is a flow chart illustrating an auto-labeling contact list operation in accordance with an aspect.

Referring now to the flow diagram 600 in FIG. 6, illustrating one aspect of labeling folders of content using a user's contact list. At 602, the method includes receiving and reviewing personal information relating to a user of a wireless device, e.g., a contact list or calendar. For example, computing device 108 may receive and review a contact list from wireless device 102 including, for example, names, addresses and phone numbers, or any combination of these, for individuals or businesses listed in the contact list.

In an optional aspect, at 604, the method may include performing address cleaning on the information in the contact list. The address cleaning may include, for example, verifying that a zip code is correct by looking at the city and state, correcting misspellings, and modifying the address information into a consistent format, among other address cleaning methods. It should be appreciated any cleaning method may be used for cleaning the addresses stored in the contact list.

Next, at 606, the method includes providing the information from the contact list to a geo-coding component or engine and receiving corresponding latitude and longitude coordinates for the address. For example, computing device 108 may have a geo-coding component which receives the address information and generates the corresponding latitude and longitude coordinates for the address. In an aspect, a phone number may be provided to the geo-coding engine when address information is not available for generating the corresponding latitude and longitude coordinates for the phone number.

At 608, the method may include associating the received coordinates generated from the geo-coding engine with the names listed in the contact list. For example, computing device 108 may receive a copy of a contact list stored on wireless device 102 and associate the received latitude and longitude coordinates from the geo-coding engine with the names listed in the contact list. Thus, the contact list effectively becomes a point of interest (POI) database using the names and corresponding information stored in the contact list as points of interest. It should be appreciated that the contact list POI database may be used in conjunction with the process described in FIG. 5 as an alternative measure for resolving the address information to a name for the address information.

Figure 7:
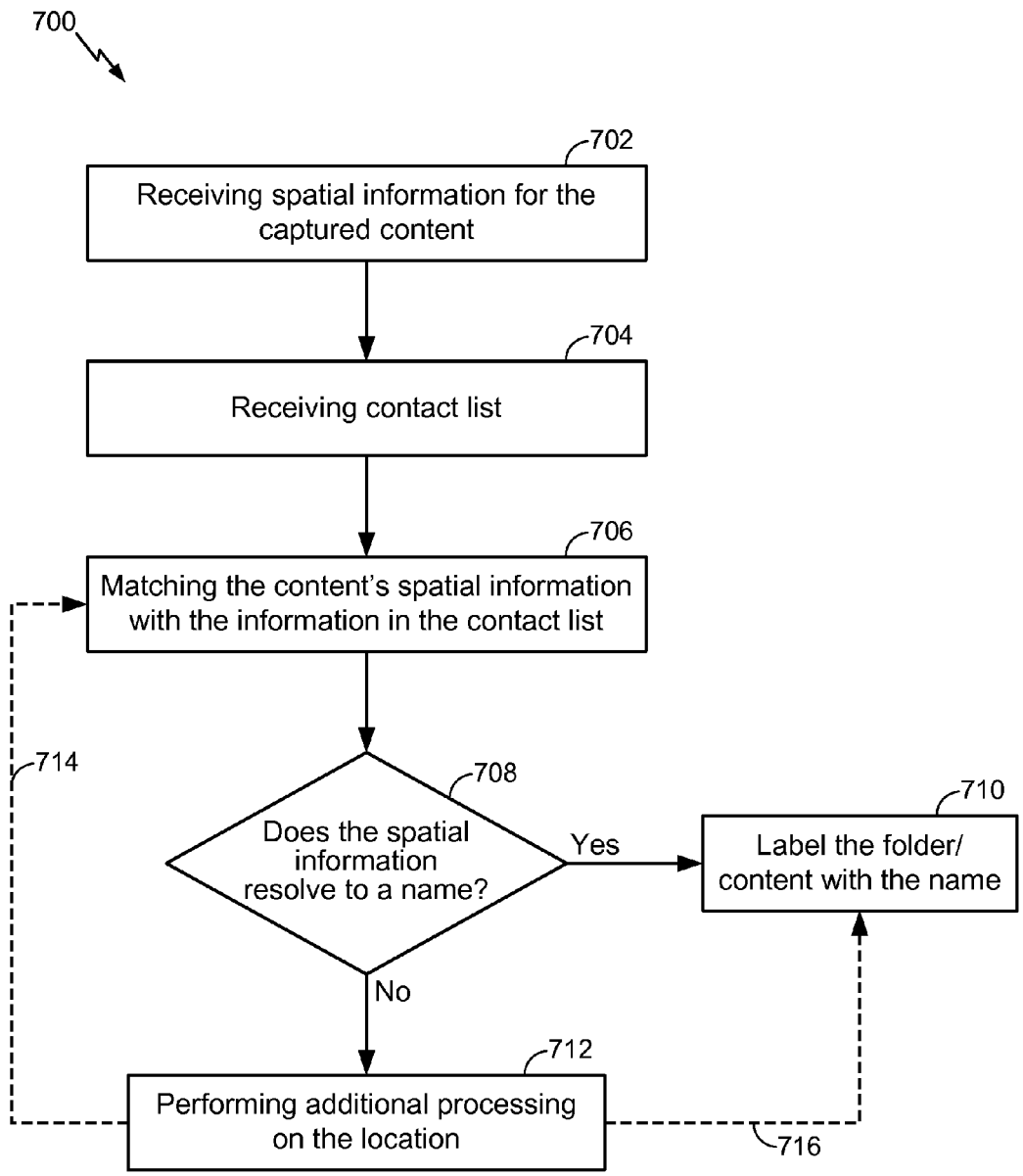
FIG. 7 is a flow chart illustrating an auto-labeling contact list operation in accordance with yet another aspect.

Referring now to the flow diagram 700 in FIG. 7, another aspect of labeling folders of content using a user's contact list or calendar stored on a wireless device is illustrated. At 702, the method includes receiving location information for the captured content. For example, computing device 108 receives location information for the content, e.g., latitude and longitude coordinates from a position/location component (e.g., a Global Positioning System (GPS) module) on the wireless device 102, indicating the coordinates where the content was captured. At 704, the method includes receiving personal information relating to a user of a wireless device, e.g., a contact list, or calendar, among other personal information. For example, computing device 108 may receive a contact list from wireless device 102, e.g., a list of names, addresses and phone numbers, or any combination of these, for individuals and/or businesses listed in the contact list. Next, at 706, the method includes matching the received content location information with the information in the contact list or calendar. For example, the contact list or calendar may have information that can be correlated to a location or time of the content, and thus the information may be used to supplement the folder or content file label. In one aspect, computing device 108 may match the content location information received with an address associated with an appointment in the calendar. In another aspect, computing device 108 may match the content location information received with the address information in the contact list. In one aspect, computing device 108 may use a geo-coding component or engine to reverse geo-code the captured content location information, e.g., providing latitude and longitude coordinates to the geo-coding engine and receiving an address for the coordinates, as discussed in regards to FIG. 5. Computing device 108 may compare the address generated by the geo-coding engine with the information in the contact list or calendar to determine whether a match exists with an address in the contact list or calendar. In another aspect, computing device 108 may provide an address from the contact list or calendar to a geo-coding component or engine and receive longitude and latitude coordinates for the address, as discussed in regards to FIG. 6. Computing device 108 may compare the coordinates of the content with the generated coordinates for the addresses in the contact list or calendar to determine whether a match exists with an address in the contact list or calendar.

At 708, the method includes determining whether the location information for the content resolves to an address of a name in the contact list or calendar. For example, the computing device at 706 determines whether there is a match between the content location information and the information stored in the contact list or calendar. At 710, the method includes creating a label for a folder and/or content with the name from the contact list or calendar that matches the location information. For example, computing device 108 may create a label for the folder and/or the content with the name from the contact list or calendar. At 712, the method includes performing additional processing on the location information if the information in the contact list or calendar does not match the content location information, such as those mentioned at 514 (FIG. 5). If a name is generated for the location information after performing the additional processing, then the method may follow 716 back to 710 for creating a label for the folder and/or the content with the name. However, if a name is not generated for the location information after performing the additional processing, then the method may follow 714 back to 706 and the method may repeat attempting to match the location information with the addresses in the contact list. The calendar information may also reveal additional names of individuals that were present when the content was captured. In addition, the calendar information may also help in resolving the proper location and/or time range to use in analyzing the final set of content to be included in the group.

Figure 8:
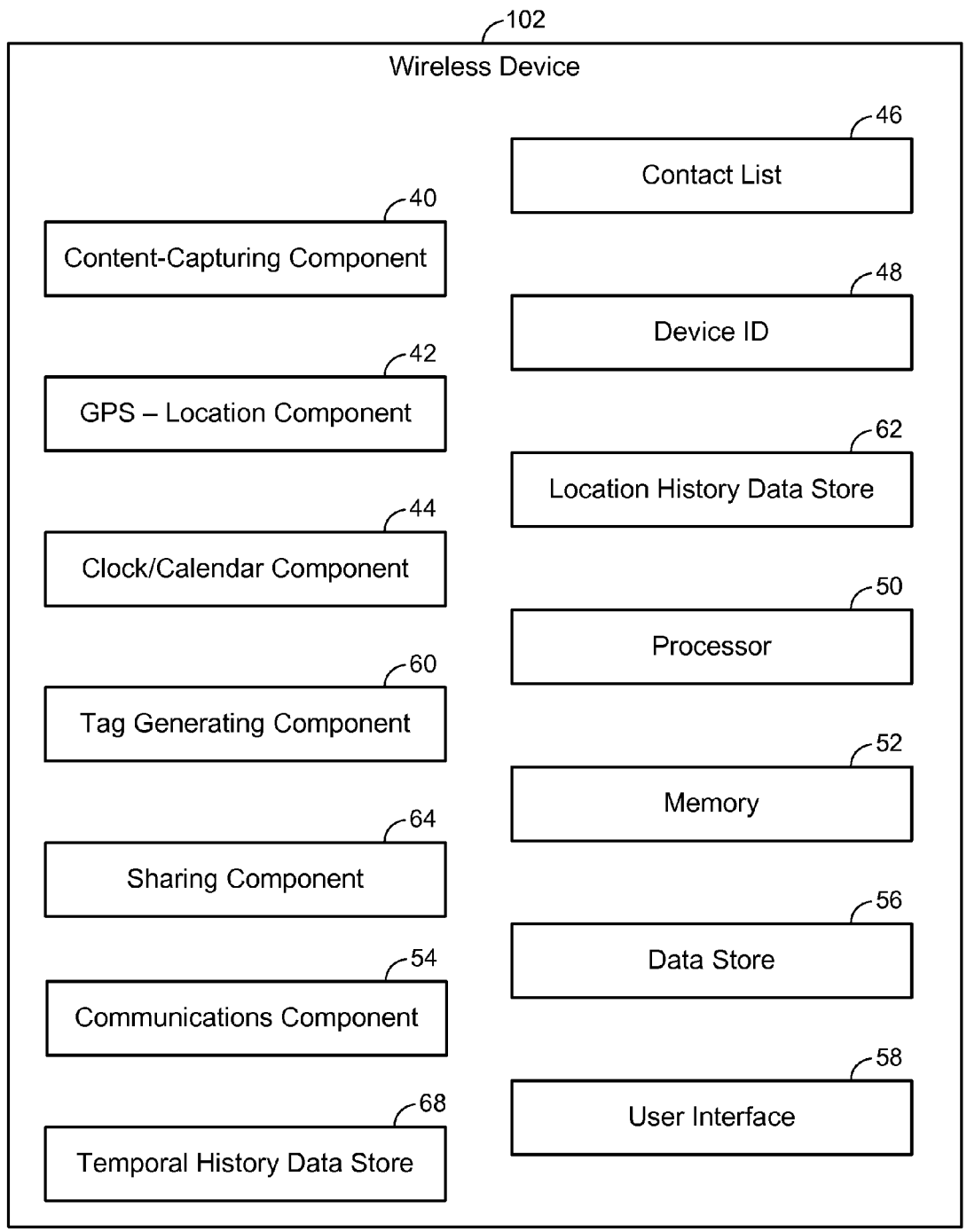
FIG. 8 is an illustration of an example mobile device operable within the connectivity system in accordance with an aspect.

Turning now to FIG. 8, illustrated is an example wireless device 102 in accordance with one aspect. Wireless device 102 provides a user with communication access to access network 106, as well as with the other components of system 100. Wireless device 102 includes a mobile communication device operable on a wireless communication system. As can be appreciated, there are a variety of wireless communication systems, which often employ different spectrum bandwidths and/or different air interface technologies. Exemplary systems include, without limitation, CDMA (CDMA 2000, EV DO, WCDMA), OFDM, or OFDMA (Flash-OFDM, 802.20, WiMAX, LTE), FDMA/TDMA (GSM) systems using FDD or TDD licensed spectrums, peer-to-peer (e.g., mobile-to-mobile) ad hoc network systems often using unpaired unlicensed spectrums, and 802.xx wireless LAN or BLUETOOTH techniques.

Wireless device 102 includes processor component 50 for carrying out processing functions associated with one or more of components and functions described herein. Processor component 50 can include a single or multiple set of processors or multi-core processors. Moreover, processing component 50 can be implemented as an integrated processing system and/or a distributed processing system.

Wireless device 102 further includes a memory 52, such as for storing local versions of applications being executed by processor component 50. Memory 52 can include random access memory (RAM), read only memory (ROM), and a combination thereof.

Further, wireless device 102 includes a communications component 54 that provides for establishing and maintaining communications with one or more parties utilizing hardware, software, and services as described herein. Communications component 54 may carry communications between components on wireless device 102, as well as between wireless device 102 and external devices, such as devices located across a communications network and/or devices serially or locally connected to wireless device 102.

Additionally, wireless device 102 may further include a data store 56, which can be any suitable combination of hardware and/or software, that provides for mass storage of information, databases, and programs employed in connection with aspects described herein. For example, data store 56 may be a data repository for applications not currently executing. Moreover, wireless device 102 may include applications 62.

Wireless device 102 may additionally include a user interface component 58 operable to receive inputs from a user of wireless device 102, and to generate outputs for presentation to the user. User interface component 58 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 58 may include one or more output devices, including but not limited to a display, a speaker, a haptic feedback mechanism, a printer, any other mechanism capable of presenting an output to a user, or any combination thereof.

In addition, wireless device 102 may include a content-capturing component 40 operable for capturing content, e.g., a picture, a video, a sound recording, or any other type of media content. Wireless device 102 may include a GPS/Location component 42 operable for generating latitude and longitude coordinates for wireless device 102. Wireless device 102 may also include a clock/calendar component 44 operable for generating the current date and/or time. Furthermore, wireless device 102 may include a contact list component 46, which may include contact information, e.g., address and phone numbers, for individuals and/or businesses. Wireless device 102 may also include a device identification component 48 operable for generating a unique identification for the wireless device 102. Further, wireless device 102 may include a tag generating component 60 operable for generating tags for attaching with the content captured by the content-capturing component 40. For example, the tags may include the location of wireless device 102, the current date and/or time, the identification of wireless device 102, user entered information, or any other information relating to the content captured by the content-capturing component 40. Additionally, wireless device 102 may include a location history data store 62 operable for storing a set of locations wireless device 102 previously visited. Wireless device 102 may also include a temporal history data store 68 operable for storing a set of time and/or dates when content was previously captured. In addition, wireless device 102 may also include a sharing component 64 operable for sharing the captured content.

Figure 9:
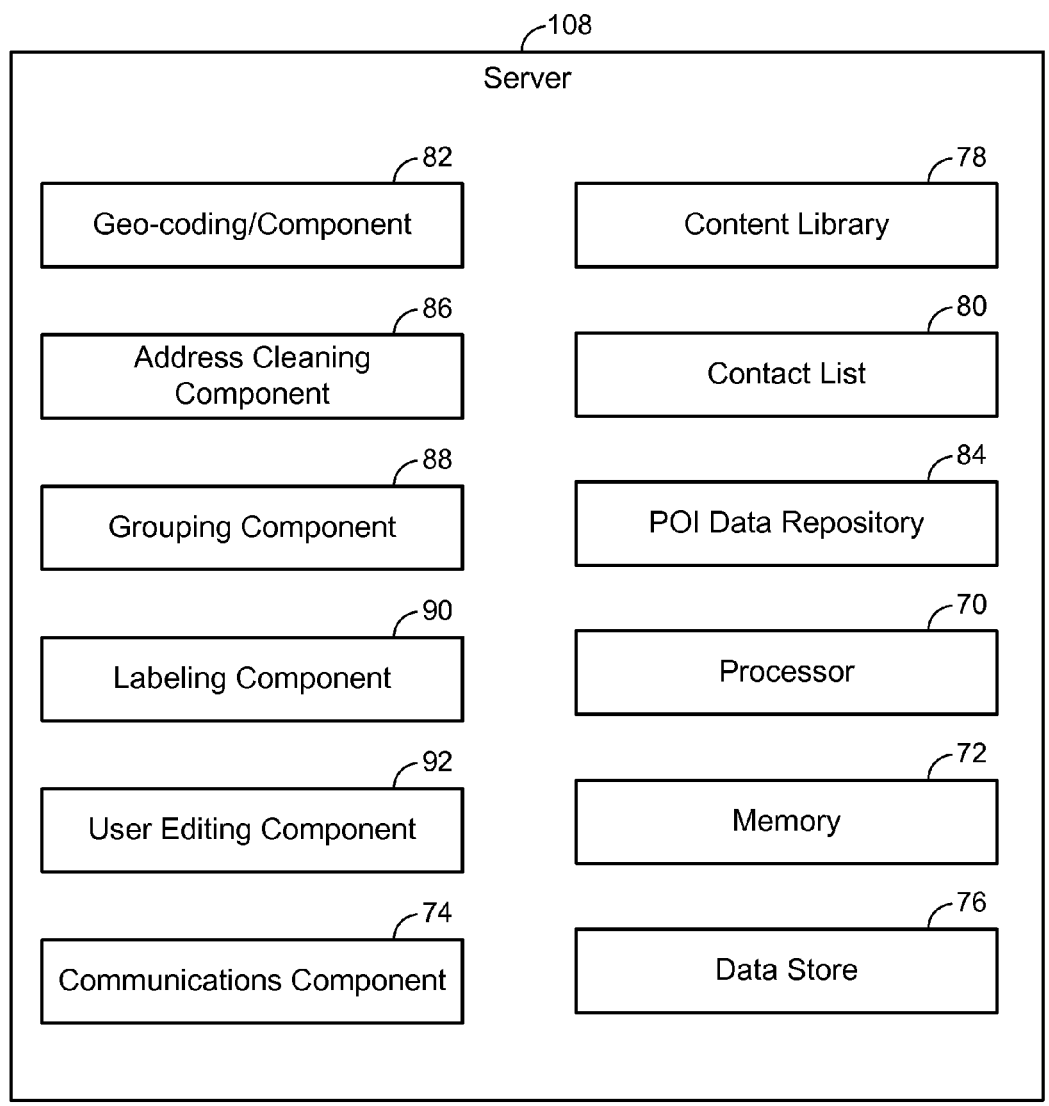
FIG. 9 is an illustration of an example server operable within the connectivity system in accordance with an aspect.

Referring now to FIG. 9, illustrated is an example server 108 in accordance with one aspect. Server 108 manages network connectivity matters for access network 106. Server 108 includes processor component 70 for carrying out processing functions associated with one or more of components and functions described herein. Processor component 70 can include a single or multiple set of processors or multi-core processors. Moreover, processing component 70 can be implemented as an integrated processing system and/or a distributed processing system.

Server 108 further includes a memory 72, such as for storing local versions of applications being executed by processor component 70. Memory 72 can include random access memory (RAM), read only memory (ROM), and a combination thereof.

Further, server 108 includes a communications component 74 that provides for establishing and maintaining communications with one or more parties utilizing hardware, software, and services as described herein. Communications component 74 may carry communications between components on server 108, as well as between server 108 and external devices, such as devices located across a communications network and/or devices serially or locally connected to server 108.

Additionally, server 108 may further include a data store 76, which can be any suitable combination of hardware and/or software, that provides for mass storage of information, databases, and programs employed in connection with aspects described herein. For example, data store 76 may be a data repository for applications not currently executing.

Server 108 may further include a content library 78 operable to store the content captured from wireless device 102 along with any tags that may be generated by the tag generating component 60 (FIG. 8). In addition, server 108 may include contact list 80, which may include a list of names, addresses, and phone numbers for individuals and/or businesses. It should be appreciated that contact list 80 may include the same data as contact list 46 (FIG. 8) or may be a copy of contact list 46. Further, server 108 may include a geo-coding component 82 operable for forward and/or reverse processing of addresses and location information, e.g., latitude and longitude coordinates, for various addresses and locations. Moreover, server 108 may further include a point of interest (POI) data repository 84 operable for storing names and addresses of individuals and/or businesses or other places of interest. Server 108 may also include an address cleaning component 86 operable for fixing errors in the addresses or modifying the address into a standard format. Additionally, server 108 may include a grouping component 88 operable for grouping and/or clustering content captured by wireless device 102. Server 108 may further include a labeling component 90 operable for labeling content, e.g., groups and/or clusters of content or individual pieces of content. Furthermore, server 108 may also include a user editing component 92 operable for allowing a user to perform edits and/or changes to the grouping or labeling process.

One variation of the aspects discussed above may include sharing mechanisms for sharing the picture captured with the individuals in the picture or the individuals who were present at the location where the picture was captured. For example, when a picture is captured by the mobile device, the mobile device may automatically ping a set of mobile devices in the area to obtain a response including information defining what individuals were with the user when the picture was captured. This information may be used for automatically sharing the picture with the mobile devices in the area when the picture was captured, or for inclusion as part of a content tag associated with the picture. In addition, facial recognition, object recognition, and audio recognition algorithms may be used for determining the individuals, locations, and/or items captured in the pictures. The algorithms may be used for automatically sharing the pictures with the individuals in the picture. In another variation, the facial recognition, audio recognition, and object recognition algorithms may be used for preprocessing the content in the picture aiding in the clustering algorithms in grouping and labeling the pictures.

It should be appreciated that the functionality discussed above in relation to the wireless device or the computing device may be performed in various locations. For example, the wireless device may perform all or a portion of the various functions discussed above in relation to the computing device. In addition, the computing device may perform all or a portion of the functionality discussed above in relation to the wireless device.

Figure 10:
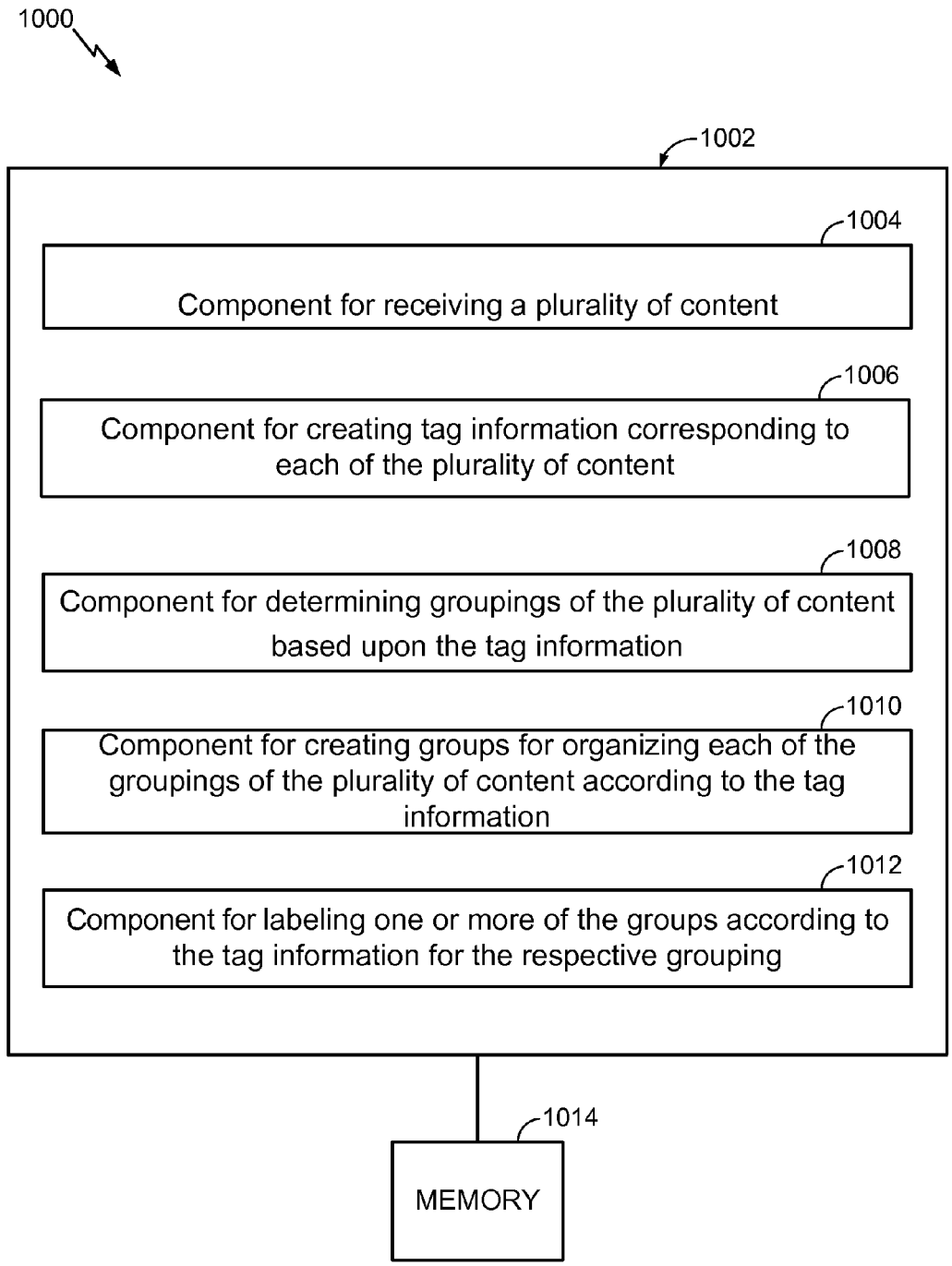
FIG. 10 is an illustration of an example system that facilitates managing content in accordance with yet another aspect.

Referring now to FIG. 10, illustrated is a system 1000 configured to manage content, according to one aspect. For example, system 1000 can reside at least partially within a transmitter, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that facilitate managing content. For instance, logical grouping 1002 may include component 1004 for receiving a plurality of content. Further, logical grouping 1002 may comprise component 1006 for creating tag information corresponding to each of the plurality of content. In addition, logical grouping 1002 may include component 1008 for determining groupings of the plurality of content based upon the tag information. Logical grouping 1002 may also include component 1010 for creating groups for organizing each of the groupings of the plurality of content according to the tag information. Logical grouping 1002 may further include component 1012 for labeling one or more of the groups according to the tag information for the respective grouping. Additionally, system 1000 can include a memory 1014 that retains instructions for executing functions associated with electrical components 1004, 1006, 1008, 1010, and 1012. While shown as being external to memory 1014, it is to be understood that one or more of electrical components 1004, 1006, 1008, 1010, and 1012 can exist within memory 1014.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as Code Division Multiple Access (CDMA), Time Division Multiple Access (TDMA), Frequency Division Multiple Access (FDMA), Orthogonal Frequency-Division Multiple Access (OFDMA), Single-Carrier FDMA (SC-FDMA) and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers Information System (IS) 2000 (IS-2000), IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE, and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features are presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for managing content, comprising:
 receiving, at a computing device, one or more content transmitted from a wireless device;
 creating, by the computing device, tag information corresponding to each of the one or more content, the tag information comprising information identifying a source of the one or more content;
 determining, by the computing device, one or more groupings of the one or more content based upon the tag information;
 in response to the determining the one or more groupings, creating, by the computing device, one or more folders for each of the one or more groupings of the one or more content according to the tag information;

labeling, by the computing device, the one or more folders according to the tag information for the respective grouping, wherein at least one of the one or more folders is labeled with a name of a contact in a contact list of the wireless device based on a determination of a match between spatial information associated with the tag information for the respective grouping and the name of the contact;

determining, by the computing device based on input received at the wireless device, whether changes need to be made to the one or more groupings, the one or more folders, the labeling of the one or more folders, or any combination thereof; and in response to determining that changes need to be made, repeating, by the computing device, the determining the one or more groupings, the creating the one or more folders, and the labeling the one or more folders.

2. The method of claim 1, wherein the tag information includes temporal information, spatial information, or any combination thereof corresponding to a respective one or more content.

3. The method of claim 1, wherein creating the tag information further comprises:

performing pattern recognition on a respective one or more content for identifying one or more items in the respective one or more content, wherein the pattern recognition is one of object recognition, audio recognition, video recognition, or any combination thereof.

4. The method of claim 1, wherein the determining the one or more groupings further comprises storing one or more group identifiers associated with the one or more content based upon the determining.

5. The method of claim 4, wherein the creating the one or more folders further comprises organizing each of the one or more groupings of the one or more content according to one or more group identifiers.

6. The method of claim 1, wherein the determining the one or more groupings further comprises grouping the one or more content based upon spatial information corresponding to the one or more content.

7. The method of claim 6, wherein the grouping based on the spatial information further comprises grouping relative to a point of interest.

8. The method of claim 7, wherein the grouping based on the spatial information further comprises:

grouping a first portion of the one or more content in association with a first point of interest when the spatial information of each of the first portion is within a first distance range of the first point of interest.

9. The method of claim 8, wherein the grouping based on the spatial information further comprises:

grouping a second portion of the one or more content in association with a second point of interest when the spatial information of each of the second portion is within a second distance range of the second point of interest.

10. The method of claim 9, wherein the grouping based on the spatial information further comprises:

when at least one of the one or more content is not initially associated with the first point of interest or the second point of interest:

calculating a first geographic centroid for the first portion of the one or more content;

calculating a second geographic centroid for the second portion of the one or more content;

grouping the at least one of the one or more content with the first portion of the one or more content when a first distance from the at least one of the one or more content to the first geographic centroid is less than or equal to a second distance from the at least one of the one or more content to the second geographic centroid; and grouping the at least one of the one or more content with the second portion of the one or more content when the first distance is greater than the second distance.

11. The method of claim 6, wherein the grouping based on the spatial information further comprises:

determining one or more spatially distinct groupings based on the spatial information; and associating the one or more content based on the spatial information with one of the one or more spatially distinct groupings.

12. The method of claim 11, wherein the association is based upon a distance from the one or more content to a calculated geographic centroid for the one or more spatially distinct groupings.

13. The method of claim 1, wherein the determining one or more groupings further comprises:

grouping the one or more content based upon temporal information.

14. The method of claim 1, wherein the determining one or more groupings further comprises:

grouping the one or more content based upon both spatial information and temporal information.

15. The method of claim 1, wherein the labeling the one or more folders further comprises:

reverse geo-coding location information for the one or more content;

generating address information for the one or more content based upon the reverse geo-coding;

resolving the address information to a name of a location; and labeling at least one of the one or more folders with the name of the location.

16. The method of claim 15, wherein resolving the address information includes at least one of: searching for the name of the location, searching a point of interest data repository for the name of the location, searching a contact list for the name of the location, searching a calendar for the name of the location, or searching a directory for the name of the location.

17. The method of claim 1, wherein the determining the match further comprises:

geo-coding an address for the contact in the contact list;

generating spatial coordinates for the address based upon the geo-coding; and comparing the spatial coordinates for the address and the spatial information.

18. The method of claim 1, wherein the determining the match further comprises:

reverse geo-coding the spatial information;

generating an address for the spatial information based upon the reverse geo-coding; and comparing the address for the spatial information and an address for the contact in the contact list.

19. The method of claim 1, wherein the labeling the one or more folders further comprises:

labeling at least one of the one or more folders with temporal information corresponding to a respective one or more content.

20. The method of claim 1, wherein the labeling the one or more folders further comprises:

labeling at least one of the one or more folders with an address associated with a calendar appointment occurring during a time period of temporal information of a respective one or more content.

21. The method of claim 1, wherein the computing device comprises a processor of the wireless device.

22. The method of claim 1, wherein the computing device comprises a network based server.

23. The method of claim 1, wherein the tag information for a given content comprises information obtained by performing pattern recognition on the given content, wherein the pattern recognition is one of object recognition, audio recognition, video recognition, or a combination of object, audio, video recognition, or any combination thereof; and
wherein the determining the one or more groupings comprises determining the one or more groupings of the one or more content based upon the tag information obtained by performing the pattern recognition.

24. The method of claim 1, wherein the information identifying the source of the one or more content comprises one or more of:
a user identification;
information identifying a person who captured created the content, or any combination thereof; or
information identifying an individual who forwarded the content.

25. The method of claim 1, further comprising:
receiving an indication of whether the one or more groupings, the one or more folders, and/or the labeling of the one or more folders is satisfactory to a user.

26. The method of claim 1, wherein the determining whether changes need to be made comprises receiving input from a user indicating that changes need to be made to the one or more groupings, the one or more folders, the labeling of the one or more folders, or any combination thereof.

27. The method of claim 1, wherein the determining the one or more groupings, the creating the one or more folders, and the labeling of the one or more folders is repeated until input is received from a user indicating that the one or more groupings, the one or more folders, and the labeling are satisfactory to the user.

28. At least one processor configured to manage content, comprising:
a first hardware module configured to receive one or more content transmitted from a wireless device;
a second module configured to create tag information corresponding to each of the one or more content, the tag information comprising information identifying a source of the one or more content;
a third module configured to determine one or more groupings of the one or more content based upon the tag information;
a fourth module configured to create, in response to a determination of the one or more groupings, one or more folders for each of the one or more groupings of the one or more content according to the tag information;
a fifth module configured to label the one or more folders according to the tag information for the respective grouping, wherein at least one of the one or more folders is labeled with a name of a contact in a contact list of the wireless device based on a determination of a match between spatial information associated with the tag information for the respective grouping and the name of the contact;
a sixth module configured to determine, based on input received at the wireless device, whether changes need to be made to the one or more groupings, the one or more folders, the labels of the one or more folders, or any combination thereof; and
a seventh module configured to repeat, in response to a determination that changes need to be made, the determination of the one or more groupings, creation of the one or more folders, and the labeling of the one or more folders.

29. A non-transitory computer-readable medium comprising:
at least one instruction for causing a computer to receive one or more content transmitted from a wireless device;
at least one instruction for causing the computer to create tag information corresponding to each of the one or more content, the tag information comprising information identifying a source of the one or more content;
at least one instruction for causing the computer to determine one or more groupings of the one or more content based upon the tag information;
at least one instruction for causing the computer to create, in response to a determination of the one or more groupings, one or more folders for each of the one or more groupings of the one or more content according to the tag information;
at least one instruction for causing the computer to label the one or more folders according to the tag information for the respective grouping, wherein at least one of the one or more folders is labeled with a name of a contact in a contact list of the wireless device based on a determination of a match between spatial information associated with the tag information for the respective grouping and the name of the contact;
at least one instruction for causing the computer to determine, based on input received at the wireless device, whether changes need to be made to the one or more groupings, the one or more folders, the labels of the one or more folders, or any combination thereof; and
at least one instruction for causing the computer to repeat, in response to a determination that changes need to be made, the determination of the one or more groupings, creation of the one or more folders, and the labeling of the one or more folders.

30. An apparatus for managing content, comprising:
means for receiving one or more content transmitted from a wireless device;
means for creating tag information corresponding to each of the one or more content, the tag information comprising information identifying a source of the one or more content;
means for determining one or more groupings of the one or more content based upon the tag information;
means for creating, in response to a determination of the one or more groupings, one or more folders for each of the one or more groupings of the one or more content according to the tag information;
means for labeling the one or more folders according to the tag information for the respective grouping, wherein at least one of the one or more folders is labeled with a name of a contact in a contact list of the wireless device based on a determination of a match between spatial information associated with the tag information for the respective grouping and the name of the contact;
means for determining, based on input received at the wireless device, whether changes need to be made to the one or more groupings, the one or more folders, the labels of the one or more folders, or any combination thereof; and
means for repeating, in response to a determination that changes need to be made, the determination of the one or more groupings, creation of the one or more folders, and the labeling of the one or more folders.

31. An apparatus for managing content, comprising:
a hardware communications component configured to receive one or more content transmitted from a wireless device;
a tag generating component configured to create tag information corresponding to each of the one or more content, the tag information comprising information identifying a source of the one or more content;
a grouping component configured to determine one or more groupings of the one or more content based upon the tag information and to create, in response to a determination of the one or more groupings, one or more folders for each of the one or more groupings of the one or more content according to the tag information;
a labeling component configured to label the one or more folders according to the tag information for the respective grouping, wherein at least one of the one or more folders is labeled with a name of a contact in a contact list of the wireless device based on a determination of a match between spatial information associated with the tag information for the respective grouping and the name of the contact; and
a determining component configured to determine, based on input received at the wireless device, whether changes need to be made to the one or more groupings, the one or more folders, the labels of the one or more folders, or any combination thereof, and, in response to a determination that changes need to be made, to cause the grouping component to repeat the determination of the one or more groupings and creation of the one or more folders, and the labeling component to repeat the labeling of the one or more folders.

32. The apparatus of claim 31, wherein the tag information further includes temporal information, spatial information, or any combination thereof corresponding to a respective one or more content.

33. The apparatus of claim 31, wherein the tag generating component being configured to create the tag information further comprises the tag generating component being configured to perform pattern recognition on a respective one or more content for identifying one or more items in the respective one or more content, wherein the pattern recognition is one of object recognition, audio recognition, video recognition, or any combination thereof.

34. The apparatus of claim 31, wherein the grouping component is further configured to store one or more group identifiers associated with the one or more content based upon the determination of the one or more groupings.

35. The apparatus of claim 34, wherein the grouping component is further configured to group the one or more content based upon the one or more group identifiers associated with the one or more content.

36. The apparatus of claim 31, wherein the grouping component is further configured to group the one or more content based upon spatial information corresponding to the one or more content.

37. The apparatus of claim 36, wherein the grouping component is further configured to group the one or more content relative to a point of interest.

38. The apparatus of claim 37, wherein the grouping component is further configured to group a first portion of the one or more content in association with a first point of interest based on the spatial information of each of the first portion being within a first distance range of the first point of interest.

39. The apparatus of claim 38, wherein the grouping component is further configured to group a second portion of the one or more content in association with a second point of interest based on spatial information of each of the second portion being within a second distance range of the second point of interest.

40. The apparatus of claim 39, wherein based on at least one of the one or more content not being initially associated with the first point of interest or the second point of interest, the grouping component is further configured to:
calculate a first geographic centroid for the first portion of the one or more content;
calculate a second geographic centroid for the second portion of the one or more content;
group the at least one of the one or more content with the first portion of the one or more content when a first distance from the at least one of the one or more content to the first geographic centroid is less than or equal to a second distance from the at least one of the one or more content to the second geographic centroid; and
group the at least one of the one or more content with the second portion of the one or more content when the first distance is greater than the second distance.

41. The apparatus of claim 36, wherein the grouping component is further configured to determine one or more spatially distinct groupings based on the spatial information, and associate the one or more content based on the spatial information with one of the one or more spatially distinct groupings.

42. The apparatus of claim 41, wherein the grouping component is further configured to associate based upon a distance from the one or more content to a calculated geographic centroid for the one or more spatially distinct groupings.

43. The apparatus of claim 31, wherein the grouping component is further configured to group the one or more content based upon temporal information.

44. The apparatus of claim 31, wherein the grouping component is further configured to group the one or more content based upon both spatial information and temporal information.

45. The apparatus of claim 31, further comprising:
a geo-coding component configured to reverse geo-code location information for the one or more content, and to generate address information for the one or more content based upon the reverse geo-coding,
wherein the labeling component is further configured to resolve the address information to a name of a location, and label at least one of the one or more folders with the name of the location.

46. The apparatus of claim 45, wherein the labeling component being configured to resolve the address information includes the labeling component being configured to perform at least one of: a search for the name of the location, a search of a point of interest data repository for the name of the location, a search of a contact list for the name of the location, a search of a calendar for the name of the location, or a search of a directory for the name of the location.

47. The apparatus of claim 31, further comprising:
a geo-coding component configured to geo-code an address for the contact in the contact list, and to generate spatial coordinates for the address based upon the geo-coding,
wherein the labeling component is further configured to compare the spatial coordinates for the address and the spatial information.

48. The apparatus of claim 31, further comprising:
a geo-coding component configured to reverse geo-code the spatial information, and to generate the address for the spatial information based upon the reverse geo-coding, wherein the labeling component is further configured to compare the address for the spatial information and the address for the contact in the contact list.

49. The apparatus of claim 31, wherein the labeling component is further configured to label at least one of the one or more folders with temporal information corresponding to a respective one or more content.

50. The apparatus of claim 31, wherein the labeling component is further configured to label at least one of the one or more folders with an address associated with a calendar appointment occurring during a time period of temporal information of a respective one or more content.

51. The apparatus of claim 31, wherein the apparatus comprises the wireless device.

52. The apparatus of claim 31, wherein the apparatus comprises a network based server.

* * * * *